Patented Sept. 5, 1944

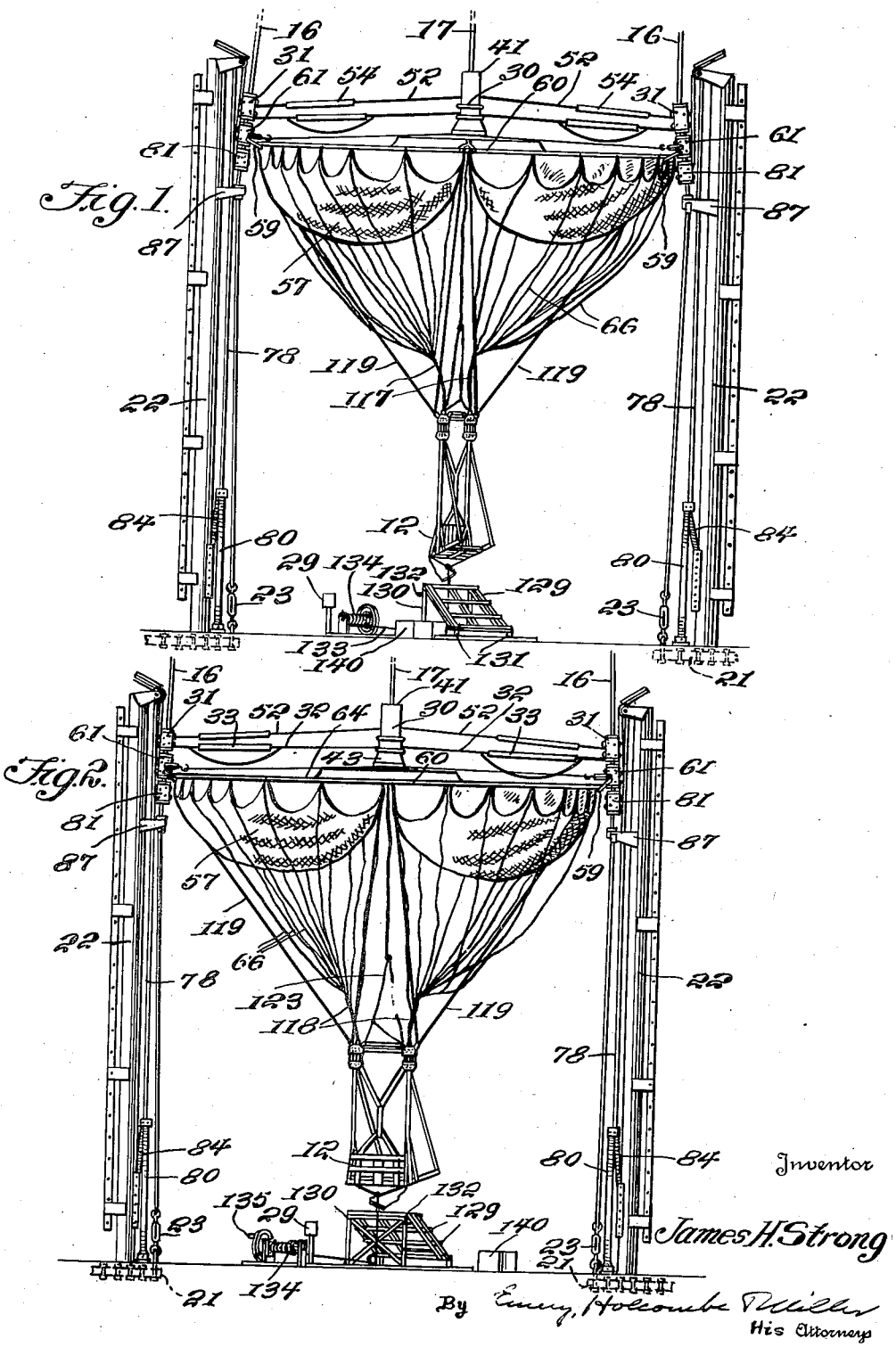

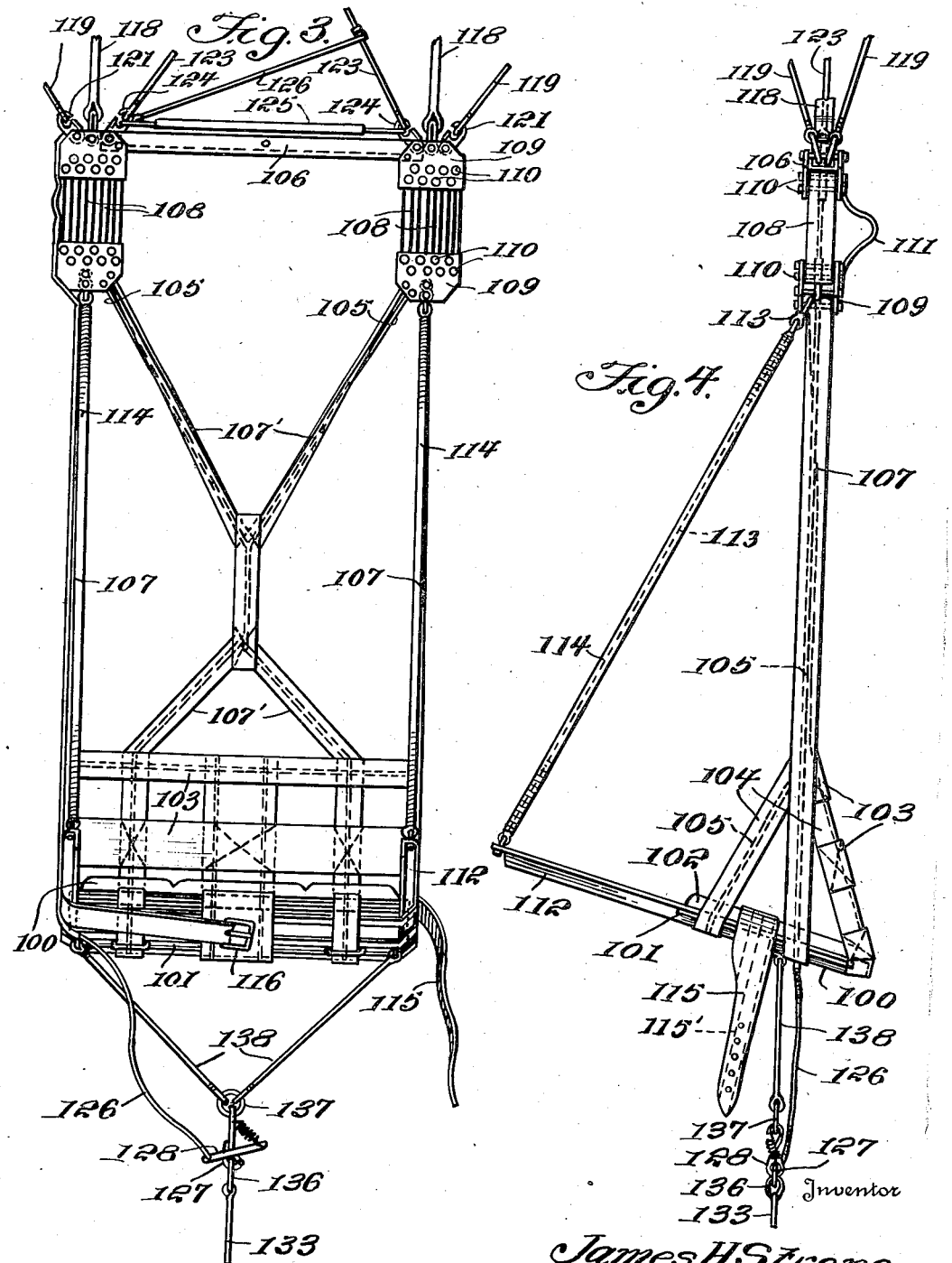

2,357,293

UNITED STATES PATENT OFFICE 2,357,293

SUSPENSION MEANS FOR PARACHUTE CARRIERS

James H. Strong, Windsor, N. J.

Original application July 28, 1939, Serial No. 287,153. Divided and this application July 30, 1941, Serial No. 404,743

8 Claims. (Cl. 272—6)

This invention relates to means for suspending a passenger carrier or other load-carrying device from a parachute, and is a division of my application Serial No. 287,153, filed July 28, 1939, now Patent No. 2,264,919, issued December 2, 1941.

In the operation of parachute jump amusement devices and in training parachute jumpers, a suitable carrier for the passenger or passengers is an important feature, and the purpose of this invention is to provide a carrier and suspension means for attachment to a captive parachute which will meet the requirements for comfort and safety in the operation of such devices.

Specific objects are to improve the construction of the carrier and suspension means to provide adequate strength with light weight, to safeguard the passengers in case of accidental breakage of some part of the suspension means, to prevent accidental overturning of the carrier or falling of passengers from the carrier, and to prevent passengers or others from severing or disconnecting any important element of the suspension system.

Other objects and advantages of the invention appear hereinafter in connection with the description of the apparatus illustrated in the accompanying drawings, wherein Fig. 1 is a three-quarter front elevation of the parachute and carrier supported by the shock absorbing means at the bottom of the descent, in readiness to be raised by the hoisting means;

Fig. 2 is a three-quarter rear elevation of the same;

Fig. 3 is a front elevation of the swing type carrier; and

Fig. 4 is a side elevation of the carrier, Figs. 3 and 4 being drawn to a larger scale than Figs. 1 and 2.

The complete apparatus comprises one or more parachute assemblies, each of which is adapted to be raised and dropped automatically by means of a hoisting cable 17 operating over sheaves supported on arms on a suitable high tower, and guided by fixed cables 16, of which there are not less than four for each parachute. The lower ends of the guide cables 16 are secured to foundation blocks 21 upon which the cushioning posts 22 are mounted, there being a turn buckle 23 or other adjusting means for adjusting the tension of each guide cable to keep it sufficiently taut to avoid undue sidewise movement of the parachutes in their ascent and descent. There are four posts 22 at each station, preferably made of steel tubes or other material having some lateral flexibility and tall enough to afford adequate space for cushioning the parachute at the end of its drop.

The hoisting drums (not shown) are of standard design and are provided with automatic guides for laying the cables 17 on them as they are wound up and unwound and the usual safety devices. They are driven through suitable reduction gears by electric motors equipped with push-button controlled starting rheostats. Automatic brakes also operated by push-button control means are provided for the hoisting drums. The system comprises a control panel at each motor and another control panel 29, at each ground station, with the necessary electric circuits and power lines, all of this electrical equipment being of standard design, and these parts of the system require no detailed description.

Each hoisting cable is provided at its free end with a head 30 for attaching it to the corresponding parachute and which is guided centrally between the guide cables 16 by means of sliding fittings 31 to which it is connected by steel wires or cables 32 fitted with short sections of rubber cord 33 to give them a limited amount of stretch, and each hoisting head preferably embodies a grappling and releasing mechanism having a portion 43 for engaging a fitting on the peak of the parachute similar to that illustrated in my Patent No. 2,121,413, dated June 21, 1938, for an automatic releasing device, together with a safety device connected to brakes on the sliding fittings 31 operated by means of lines 52 fitted with rubber cord sections 54 for arresting the descent of the hoisting head should the hoisting cable fail. The hoisting heads are entirely automatic in their operation, each being actuated to release the suspended parachute by the engagement of the buffer 41 against the underside of a fixed stop mounted on the arm of the tower overhanging the upper end of the path of movement of the parachute.

Each parachute comprises a canopy 57 which in the apparatus illustrated, is removably secured to a steel spreader ring 60 around its perimeter by means of straps or other suitable fastenings, and this ring is attached by snap hooks 59 at four points to guide blocks 61 slidably mounted on the guide cables 16. Also slidably mounted on the guide cables 16 below the guide blocks 61 and above the brackets 87 are cushioning fittings 81, normally held by the lines 78 and rubber shock cords 80 in position for catching the parachute and suspended parts at the lower end of each drop, as described in my application Serial No. 287,153, now Patent No. 2,264,919, issued December 2, 1941.

The swing 12 is made of a light metal frame 100, a wood bottom 101 supported thereby and in turn supporting a cushion 102, and a flexible back 103 and sides made of double strips of webbing reinforced with fine wire cables 105, all supported from a spreader bar 106, by spring suspension means from which depend two vertical webbing members 107 joined by a plurality of diagonal webbing members 107', all of which are reinforced with metal cables and secured at their lower ends to members 104 running to the sides and corners of the seat, and to the back, respectively, as illustrated in Figs. 3 and 4. These side and back webbing members pass completely under the seat to constitute a sling for supporting the seat and passengers. The spring suspension means includes two groups of rubber shock members 108, one at each end of the spreader bar, secured between upper and lower fittings 109 which are provided with removable pins 110 to enable the number of rubbers to be changed to suit different conditions of use. Two safety cables 111 limit the amount of stretch of the rubber shock members.

In order to prevent overturning of the swing, a bar 112 projects forward from the seat frame on each side, and each bar is connected at its front end with the lower rubber fitting 109 by means of a cable 113 enclosed in a stiff metal tube 114. A wide webbing strap 115, made double and reinforced with light wire cables 115', is secured at one end beneath the seat and the other end may be passed over the laps of the passengers and made fast below the seat by means of a strong buckle 116, out of reach of the passengers. Thus the passengers may be secured to the seat so as to prevent them from falling, and the parts of the swing are so constructed that the passengers cannot overturn the swing or free themselves by the use of knives or other means available to them while in the air.

The spreader or suspension bar 106 is suspended from the parachute directly by the shrouds 66, which are brought down in two groups and made fast to shackles 117 connected to the spreader bar by heavy webbing supports 118 embracing U-shape fittings at its ends. The spreader bar is also suspended from the guide cables 16 and spreader ring 60 by means of four cables 119, each of which is secured to a support in the lower end of one of the guide blocks 61 by means of a ring, and the lower ends of these cables 119 are connected to snap hooks 121 at the ends of the spreader bar, thereby providing a reliable suspension means for the swing. As each canopy skirt is strapped to its spreader ring, which in turn is strapped to the guide blocks and also held in place between two arms 59 carried thereby which project inwardly far enough to engage above and below the spreader ring, the failure of one or two fittings or cables or shroud lines will not permit the swing to break away from the parachute assembly so as to fall freely, even should the ring itself break.

For elevating the swing when the parachute is deflated, a separate bridle 123 is provided, the upper end of which is attached to the center post fitted in the peak of the parachute to be engaged by the hoisting head. The lower ends of the bridle are attached to the swing suspension means by snap hooks 124. This bridle is made just long enough to carry the weight of the swing when the parachute is extended vertically by the hoisting means without putting any strain on the suspension cables or shrouds, so that when the parachute is inflated the bridle will be slack. A rubber cord 125 holds the snap hooks 124 in place properly when the bridle is slack. The snap hooks 124 are of the type that in themselves retain the eyes at the ends of the bridle from disengagement, and the rubber cords merely prevent the snap hooks from accidentally turning over on their pivotal points of connection to the fittings 109 and thereby permitting the bridle 123 to foul the suspension shroud lines 118, which are loose when the bridle picks up the weight of the swing at the start of the ascent and remain loose for some twenty feet of the initial drop after the bridle has let go at the top of the ascent during which time the canopy is deflated. A light line 126 is connected to one part of the bridle near the lower end to trip the holding-down hook 127 by raising the keeper 128 when the hoisting cable picks up the weight of the swing and stretches the bridle taut, as hereinafter described.

The shock cords 80 normally support the sliding fittings 81 and deflated parachute, swing and hoisting head near the tops of the cushioning posts, in which position the swing is four or five feet above the ground, and steps 129 are provided for convenient access. These steps are preferably supported on a metal frame 130, which is pivoted at its front end to a base frame 131 and provided with a handle 132 for turning it over to remove the steps from under the swing after the passengers are seated in order to make room for the swing to drop nearly to the ground upon its descent. A hold-down cable 133 is provided for holding the swing down at a convenient height above the ground to enable the passengers to get on and off the swing, the releasable hook 127 being connected to its free end as shown in Figs. 3 and 4. At the rear end of the ground frame is mounted a hand winch 134 having a winding drum geared to a crank 135 and provided with a ratchet and pawl device for preventing unwinding of the cable. The free end of the cable is detachably secured to the swing by ring 136 which hooks into the pelican hook 127 which in turn is supported by a ring 137 secured beneath the seat by short tie members 138. The keeper 128 is tripped by the line 126 which runs to the bridle when the lifting strain of the hoisting cable straightens out the bridle to lift the swing, thereby automatically releasing the swing from the holding-down cable and permitting the swing to ascend, the shock cords 80 assisting in starting the swing upwards when the holding-down cable is released.

The apparatus may be operated by a single ground attendant, although two attendants can handle the passengers more expeditiously. After the passengers are seated, the safety strap 116 is buckled around them, and the hoisting motor starting button on the control panel 29 is pressed to elevate the swing. The pelican hook 127 trips automatically, and after the swing clears the cushioning posts, the steps 129 are turned over forwards out of the way by the attendant, who then watches the ascent until the hoisting head reaches the top of its travel and the contact member 41 strikes the fixed tripping plate on the arm overhead and opens the sliding jaws to release the parachute. At the same time the hoisting motor is automatically stopped. The attendant thereupon presses the button on the control panel 29 to reverse the hoisting motor and lower the hoisting head. Should anything go wrong during the ascent or descent, the motor can be stopped by turning off the current by the main power switch at either the motor control panel or the ground control panel.

At the bottom of the descent the sliding fittings 61 attached to the parachute skirt strike the sliding fittings 81 on the upper ends of the cushioning posts and depress them, thereby stretching the principal shock cords 80 and the auxiliary shock cords 84. These cords are so adjusted that the momentum of the parachute, swing and passengers will be counterbalanced and checked just before the sliding fittings 81 strike the brackets 87. The tension in the stretched shock cords will thereupon lift the parachute, swing and passengers four or five feet, and as the swing comes to rest, the attendant hooks on the holding-down cable 133 and operates the winch 134 to pull the swing down to a convenient level for the passengers to disembark, following which he tips the steps back into place and unbuckles the safety strap and helps the passengers down.

The provision of a holding-down means for regulating the height at which the swing is held to load and unload passengers makes very high steps unnecesary, and expedites the handling of the passengers, as the attendants can stand on the ground and reach them without difficulty, assisting them so that they do not fall in getting on and off the swing, and making sure that they are properly strapped in place and that they have a firm grip on the sides of the swing and on each other. A box 140 is preferably provided for men's and ladies' hats and slippers and other articles that might otherwise be lost off or dropped while in the air.

The swing is so designed that the passengers cannot overturn it either accidentally or purposely, and the webbing back, sides and safety belt prevent them from falling or jumping off the seat, as they cannot slide out from under the belt. Even small children and drunken persons can be carried with safety, and the rate of ascent and descent is slow enough to prevent physical discomfort or strain upon persons with sensitive or weak organs.

The invention is not restricted to the particular design shown in the drawings, as it is contemplated that changes in the arrangement and details of construction will be necessary to suit manufacturing conditions and locations, and variations in the manner and kind of use of the several novel features. Where the word "swing" is used in the claims, I mean to include any equivalent device for carrying a suspended load; and by the word "resilient" I mean to include elastic substances generally, which when deformed, tend to return to their original shape or dimensions.

I claim the following as my invention:

1. A parachute swing including a rigid seat frame and a seat carried thereby, a suspension bar connected at its ends to adjacent ends of the seat frame by means of vertical webbing members, diagonal webbing members connecting said suspension bar to the rear edge of said seat frame, said members being continued beneath and across said frame to support the seat, and fabric cross members connecting the diagonal webbing members and adjacent vertical webbing members to form a flexible back of said swing.

2. A parachute swing including a rigid seat frame and a seat carried thereby, a suspension bar connected at its ends to adjacent ends of the seat frame by means of vertical webbing members branching to the corners of the seat frame, diagonal webbing members connecting said spreader bar to the rear edge of said seat frame, fabric cross members connecting the diagonal webbing members and adjacent vertical webbing members to form a flexible back for said swing, and means connecting adjacent vertical and diagonal webbing members to form sides for said swing.

3. A parachute swing for one or more passengers including a rigid seat frame and a seat carried thereby, a suspension bar connected at its ends to adjacent ends of the seat frame by means of double faced vertical webbing members, diagonal webbing members connecting said bar to the rear edge of said seat frame, and fabric cross members connecting the diagonal rear edge webbing members and adjacent vertical members to form a flexible back for said swing, and flexible cables sewn between the faces of said double faced fabric ties to reinforce them and prevent severance thereof by a passenger.

4. A parachute swing including a rigid seat frame and a seat carried thereby, a suspension bar connected at its ends to adjacent ends of the seat frame by means of fabric ties, additional ties connecting said bar to the rear edge of said seat frame, fabric members connecting the rear edge ties and adjacent end ties to form a flexible back for said swing, and bars rigidly connected to and projecting in front of said seat frame at its ends and connected to the spreader bar by rigid struts to prevent the swing from overturning.

5. In a parachute suspension system for a carrying device, a parachute canopy provided with shrouds, said shrouds being divided into not less than two groups with their free ends connected together in each group, a rigid spreader for supporting a passenger-carrying device, the free ends of each of said groups of shrouds being attached to said spreader at spaced points, and connections secured to said spreader at said points at their upper ends and to said passenger-carrying device at their lower ends, in combination with means for relieving the load of said passenger carrying device on said shrouds when the canopy is deflated.

6. In a parachute suspension system for a carrying device, a parachute canopy provided with shrouds, said shrouds being divided into not less than two groups with their free ends connected together in each group, a rigid spreader for supporting a passenger-carrying device, the free ends of each of said groups of shrouds being attached to said spreader at spaced points, and connections secured to said spreader at said points at their upper ends and to said passenger-carrying device at their lower ends, said connections comprising extensible resilient members for absorbing unusual stress on said suspension system, in combination with means connected to said spreader for relieving the load of said passenger carrying device on said shrouds when the canopy is deflated.

7. In parachute apparatus for carrying passengers comprising a canopy provided with shrouds and having spaced guiding means for its skirt adapted to slide on guide cables supported from a tower, a spreader bar adapted to be suspended from said shrouds, said spreader bar supporting a passenger-carrying device, and a plurality of connections adapted to be secured to said spreader bar extending between said spreader bar and said skirt guiding means for supporting the passenger-carrying device therefrom independently of said canopy, in combination with means for removably attaching said shrouds and connections to said spreader bar at points spaced lengthwise thereof.

8. In parachute apparatus comprising a parachute having shrouds and a spreader bar supported thereby as described in claim 7, wherein the shrouds are divided into not less than two groups, separate means attached to the free ends of each group respectively connecting said ends together and attached to said spreader bar at spaced points, respectively.

JAMES H. STRONG.